(12) United States Patent
Pawlow et al.

(10) Patent No.: US 7,608,664 B2
(45) Date of Patent: Oct. 27, 2009

(54) CURABLE SEALANT COMPOSITION AND METHOD FOR MANUFACTURING SAME

(75) Inventors: James H. Pawlow, Akron, OH (US); Yuan-Yong Yan, Copley, OH (US); Takayuki Yako, Tokyo (JP); Jason T. Poulton, Akron, OH (US)

(73) Assignee: Bridgestone Corporation (JP)

( * ) Notice: Subject to any disclaimer, the term of this patent is extended or adjusted under 35 U.S.C. 154(b) by 103 days.

(21) Appl. No.: 11/795,487

(22) PCT Filed: Jan. 18, 2006

(86) PCT No.: PCT/US2006/001798

§ 371 (c)(1),
(2), (4) Date: Sep. 18, 2007

(87) PCT Pub. No.: WO2006/078756

PCT Pub. Date: Jul. 27, 2006

(65) Prior Publication Data

US 2008/0161491 A1    Jul. 3, 2008

Related U.S. Application Data

(60) Provisional application No. 60/444,866, filed on Jan. 18, 2005.

(51) Int. Cl.
*C08F 8/00* (2006.01)
*C08C 19/34* (2006.01)
*C08F 4/48* (2006.01)

(52) U.S. Cl. ............... 525/105; 525/338; 524/572

(58) Field of Classification Search ........... 525/105, 525/338; 524/572
See application file for complete search history.

(56) References Cited

U.S. PATENT DOCUMENTS

| | | | |
|---|---|---|---|
| 3,838,108 A | 9/1974 | Hergenrother et al. | |
| 4,397,994 A | 8/1983 | Takeuchi et al. | |
| 5,310,798 A | 5/1994 | Lawson et al. | |
| 5,336,726 A | 8/1994 | DeBois | |
| 5,405,911 A * | 4/1995 | Handlin et al. | 525/139 |
| 5,521,255 A * | 5/1996 | Roy | 525/342 |
| 5,548,025 A * | 8/1996 | Bening | 525/105 |
| 6,737,470 B1 | 5/2004 | Yako et al. | |

FOREIGN PATENT DOCUMENTS

| | | |
|---|---|---|
| EP | 0240044 | 10/1987 |
| EP | 0312967 | 4/1989 |
| EP | 0745613 | 12/1996 |
| EP | 1439194 | 7/2004 |

OTHER PUBLICATIONS

Foss, R.P. et al., "A New Difunctional Anionic Initiator", Macromolecules, vol. 10, No. 2, pp. 287-291 [Mar.-Apr. 1977].
Lo, G.Y.S. et al., "Studies on Dilithium Initiators. 3. Effect of Additives and Seeding", Macromolecules, vol. 27, No. 8, pp. 2233-2240 [1994].
Tung, L.H. et al., "Studies on Dilithium Initiators. 1. Hydrocarbon-Soluble Initiators", Macromolecules, vol. 27, No. 8, pp. 2219-2224 [1994].
Yu, Y.S. et al., "Efficiency of the sec-Butyllithium/m-Diisopropenylbenzene Diadduct as an Anionic Polymerization Initiator in Apolar Solvents", Macromolecules, vol. 27, No. 21, pp. 5957-5963 [1994].
Jun. 13, 2008 Office Action from U.S. Appl. No. 10/552,122, filed Oct. 4, 2005 [5 pp.].

* cited by examiner

*Primary Examiner*—Fred M Teskin
(74) *Attorney, Agent, or Firm*—Meredith E. Hooker; Nathan Lewis

(57) ABSTRACT

In one embodiment of the present invention, a curable sealant composition and method for its preparation are provided. The composition includes a polymer which is prepared by functionalizing a poly(conjugated diene) with a curable group such as a tetra-substituted silicon compound and then substantially hydrogenating the functionalized polymer in the presence of a Ziegler type catalyst. The composition can further include additional curable sealant ingredient selected from the group consisting of plasticizers, fillers, reinforcing agents, modifiers, curing catalysts/hardeners, stabilizers, and mixtures thereof.

9 Claims, No Drawings

CURABLE SEALANT COMPOSITION AND METHOD FOR MANUFACTURING SAME

This application is the National Stage of International Application No. PCT/US2006/001798, filed Jan 18, 2006, which claims priority to U.S. application Ser. No. 60/644,866, filed Jan 18, 2005.

BACKGROUND OF THE INVENTION

The present invention is generally directed to a curable sealant composition and a method for manufacturing the composition. It is more specifically directed to a saturated curable sealant composition.

Polymers obtained by polymerizing or copolymerizing conjugated dienes are widely utilized for commercial purposes, such as preparation of sealant compositions. However, because these polymers have residual unsaturated double bonds in their polymer chains, the sealants are disadvantageously deficient in resistance to weather conditions, oxidation and ozone, and tend to become brittle on aging. This deficiency can be notably improved by hydrogenating such conjugated diene polymers and consequently eliminating a sufficient amount, if not all, of the unsaturated double bonds persisting in the polymer chain thereof.

Conventional hydrogenation for this purpose typically involves a three-step process. First, a polymer is formed using conjugated diene monomers and polymerization. Then, the polymer system is hydrogenated to remove double bonds in the polymer backbone. Finally, the desired functional group is placed on the ends of the polymer chain using an appropriate chemical reaction such as urethane formation, condensation, or hydrosilation. A three-step reaction, such as that described here, can often be time-consuming and expensive. Also multi-step processes are known to suffer from reduced yields over processes including fewer steps. However, the three-step process has been considered necessary in the art, because the presence of functionalities is often known to inhibit or lower the efficiency of the hydrogenation catalyst and, therefore, the hydrogenation step need to be carried out prior to functionalizing the polymers.

The present invention advantageously provides a method for preparing functionalized and hydrogenated polymer, in which the hydrogenation step is conducted in the presence of the functional group, or in other words, after the functionalization step. The process of the present invention is a less expensive and more efficient in directly preparing, e.g. alkoxysilane functionalized sealant compositions, with low amounts of remaining olefin and improved product durability.

BRIEF DESCRIPTION OF THE INVENTION

In one embodiment of the present invention, a curable sealant composition is provided. The composition comprises a substantially saturated polymer including silicon-containing groups. The composition optionally further includes additional curable sealant ingredients selected from the group consisting of plasticizers, fillers, reinforcing agents, modifiers, curing catalysts/hardeners, stabilizers, and mixtures thereof.

In a second embodiment of the present invention, a process for forming a curable sealant is provided. The process comprises initiating a living polymerization of conjugated diene monomer units with a multifunctional substituted initiator, and terminating the polymerization with a tetra-substituted silicon reagent. The resulting polymer composition is then hydrogenated to form the desired curable sealant.

DETAILED DESCRIPTION

The present invention is directed to a curable sealant comprised of substantially saturated polymer or copolymer of conjugated dienes with curing groups. The present invention also provides an inventive method for preparing functionalized and hydrogenated polymer, in which the hydrogenation step is conducted in the presence of the functional group.

The polymer to be hydrogenated in the present invention includes polymer or copolymer formed with monomers selected from the group consisting of $C_4$-$C_8$ conjugated dienes, and mixtures thereof. Preferred conjugated dienes include 1,3-butadiene, isoprene, 1,3-pentadiene, 2,3-dimethyl-1,3-butadiene, 1,3-hexadiene, 2-methyl-1,3-pentadiene, 3,4-dimethyl-1,3-hexadiene, 4,5-diethyl-1,3-octadiene, 3-butyl-1,3-octadiene, phenyl-1,3-butadiene, and mixtures thereof. An especially preferred conjugated diene is 1,3-butadiene.

The poly(conjugated diene) preferably has a number average molecular weight ($M_n$) between about 5,000 and 60,000, more preferably between about 10,000 and 35,000. While the polymer backbone is preferably linear, it may be crosslinked to form branched structures.

Additional monomers may be used with the above described conjugated diene to form a copolymer. Suitable additional monomer may include vinyl aromatic hydrocarbon monomers, ethylene oxide, propylene oxide, styrene oxide, ethylene sulfide, propylene sulfide, styrene sulfide, acetaldehyde, propionaldehyde, isobutyraldehyde, n-caproaldehyde, ethanethial, propanethial, isobutylthioaldehyde, n-caprothioaldehyde, 3-dimethyl-oxycyclobutane, 3-diethyloxycyclobutane, 3-methylethyl-oxycyclobutane, 3-diemethylthiocycylobutane, 3-diethyl-thiocyclobutane, 3-methylethylthiocyclobutane, methylethyl thioketone, methyl isopropyl thioketone and diethyl thioketone, heterocyclic nitrogen containing monomers, and mixtures thereof. Exemplary vinyl aromatic hydrocarbon monomers for use in the present invention include one or more of styrene, α-methyl styrene, 1-vinyl naphthalene, 2-vinyl naphthalene, 1-α-methyl vinyl naphthalene, 2-α-methyl vinyl naphthalene, as well as alkyl, cycloalkyl, aryl, alkaryl, and aralkyl derivatives thereof, in which the total number of carbon atoms in the combined hydrocarbon is not greater than about 18, and mixtures thereof. Exemplary heterocyclic nitrogen containing monomers include pyridine and quinoline derivatives containing at least 1 vinyl or methylvinyl group such as 2-vinylpyridine, 3-vinylpyridine, 4-vinylpyridine, 3-ethyl-5-vinylpyridine, 3-methyl-5-vinylpyridine, 3,5-diethyl-4-vinylpyridine and similar mono- and di-substituted alkenyl pyridines and like quinolines such as 2-vinylquinoline, 3-vinylquinoline, 4-vinylquinoline and mixtures thereof.

In the event additional monomer are employed to form a copolymer, the copolymer preferably includes between about 1 and 99 wt % conjugated diene contributed monomers, more preferably between about 50 and 99 wt %, and most preferably between about 70 and 99 wt %. The copolymer further preferably includes between about 1 and 99 wt % additional contributed monomer units, e.g., vinyl aromatic hydrocarbon, and α-olefins, more preferably between about 1 and 50 wt %, most preferably between about 1 and 30 wt %.

The polymer or copolymer can be formed by any polymerization technique known to the skilled artisan. Preferably, the polymerization is initiated via addition of anionic initiators that are known in the art as useful in the polymerization of diene monomers and/or copolymerization of diene monomers and vinyl aromatic hydrocarbons. In one embodiment, a functionalized lithium initiator such as butyl lithium may be used. In another certain embodiment of the invention, a multi-functionalized lithium initiator may be used to initiate the preferred living polymerization reaction. Lithium initiators with two or more active initiation sites will initiate a living polymerization with at least two living polymerization sites on each living polymer chain. The polymer backbone may have an initiator residue derived from the multi- or di-functional lithium initiator remaining at the initiation site. Especially preferred initiators include 1,3-bis(1-lithio-1,3-dimethylpentyl)benzene, 1,3-phenylenebis(3-methyl-1-phenylpentylidene)dilithium, 1,3-phyenylenebis[3-methyl-1(methylphenyl)pentylidene]dilithium, initiators derived from reaction of two molar equivalents of sec-butyllithium with 1,3-diisopropenylbenzene 1,3-di(1-phenylethenyl)benzene, 1,3-di[1-(methylphenyl)ethenyl)] benzene, bis[4-(1-phenylethenyl)phenyl]ether, 1,4-bis(1-phenylethenyl)-1,1'-biphenyl, and 2,2'-bis[4-(1-phenylethenyl)phenyl] propane, and mixtures thereof.

The polymerization is preferably carried out in solution phase with moderate temperatures, such as those between about 23° C. and about 70° C., and most preferably between about 40° C. and 60° C., under an inert atmosphere, such as $N_2$ or Ar. The initiator, conjugated diene monomer, and any additional monomer that may be included, are added to a polymerization vessel, and polymerization is initiated. Living polymerization is a preferred polymerization method, although other polymerization techniques known in the art are contemplated. The initiator is added in an amount of about 0.001 to 0.1 mol initiator per 100 grams conjugated diene, more preferably between about 0.0017 and 0.02 mol initiator per 100 grams conjugated diene monomer, most preferably between about 0.0029 and 0.01 mole per 100 grams conjugated diene monomer. The polymerization is allowed to continue until greater than 90%, preferably substantially 100% of monomer conversion has been achieved.

The polymerization can be terminated by the addition of tetra-substituted silicon compound. A preferred terminator is of the general formula:

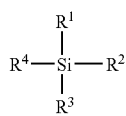

wherein $R^1$, $R^2$, $R^3$, and $R^4$ are independently selected from the group consisting of $C_1$-$C_{20}$ hydrocarbon groups, alkoxy groups and mixtures thereof. No more than three of $R^1$, $R^2$, $R^3$, and $R^4$ may be hydrocarbon groups. At least one, preferably three, of $R^1$, $R^2$, $R^3$, and $R^4$ are alkoxy groups. Suitable alkoxy groups include methoxy, ethoxy, propoxy, butoxy, pentoxy, alkoxy groups with up to about 20 carbons, and mixtures thereof. Suitable hydrocarbon groups include methyl, ethyl, propyl, butyl, pentyl, hexyl, heptyl, octyl, nonyl, decyl, and the like, and mixtures thereof. Hydrocarbon groups may be linear or branched, substituted or unsubstituted, and are preferably saturated. At least one of $R^1$, $R^2$, $R^3$, or $R^4$ should be capable of terminating the living polymerization of conjugated diene monomers.

If necessary, a 1,2-microstructure controlling agent or randomizing modifier may be used to control the 1,2-microstructure in the conjugated diene contributed monomer units, such as 1,3-butadiene, of the polymer composition. Suitable modifiers include hexamethylphosphoric acid triamide, N,N,N', N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers can also be used. The ratio of the modifier to the monomers can vary from a minimum as low as about 0 to a maximum as great as about 4000 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the polymer backbone. The 1,2-microstructure content of the conjugated diene units is preferably between about 10 and 90%, more preferably between about 40 and 70%.

According to the above embodiment of the present invention, the polymer or copolymer is hydrogenated after the termination step. The hydrogenation reaction may be conducted under $H_2$ pressures as is known in the art. The catalyst used for the polymerization can be a Ziegler type homogeneous catalyst obtained by causing organic acid salts of cobalt, nickel, iron, or chromium to react with a reducing agent such as an organic aluminum compound. A preferred catalyst is Ni/Al catalyst such as nickel carboxylate/alkyl aluminum or a catalyst such as nickel octoate or nickel ethylhexanoate. Exemplary alkyl aluminum reagents include, but are not limited to, 1,3-dichloro-1,3-dimethyldialuminoxane, diethylaluminum chloride, diethylaluminum ethoxide, diethylaluminum iodide, diisobutylaluminum chloride, diisobutylaluminum fluoride, diisobutylaluminum hydride, dimethylaluminum chloride, ethylaluminum dichloride, ethylaluminum sesquichloride, isobutylaluminum dichloride, methylaluminoxane (MAO), modified methylaluminoxane (MMAO), methylaluminum dichloride, methylaluminum sesquichloride, triethylaluminum, triethyl(tri-sec-butoxy)dialuminum, triisobutylaluminum, trimethylaluminum, trihexylaluminum, trioctylaluminum, tripropylaluminum, and the like, and the mixture thereof.

The above-described catalyst may also be used in non-functionalized polymer hydrogenation reactions. In hydrogenation reactions for non-functionalized polymers the Al to Ni ratio is preferably between 2.5 to 3, resulting in up to about 99% hydrogenation. When the catalyst is used in the above ratio to hydrogenate functionalized polymers of the type described here, low hydrogenation levels (on the order of about <50%) occur. According to the present invention, when the above described catalyst is in situ preformed and utilized at a ratio of between about 3.0 and 4.0, more preferably between about 3.1 and 3.6 to hydrogenate functionalized polymers, a hydrogenation rate of up to about 94%, more preferably up to about 96% and most preferably up to about 100% is achieved, while the functionality loss is less than about 20% and more preferably less than about 10%. A ratio of about 3.5 is especially preferred. The resulting product is preferably an end-functionalized polymer, although the functional group may also be located anywhere within the polymer backbone if desired.

The hydrogenation reaction is preferably conducted in a hydrocarbon solvent. Preferred solvents include hexane, cyclohexane, toluene, xylene, heptane, supercritical propane and ethane, and the like, and mixtures thereof.

In a specific embodiment of the present invention, a silane modified polybutadiene is hydrogenated according to the following scheme, in which x, y, and z are integral number.

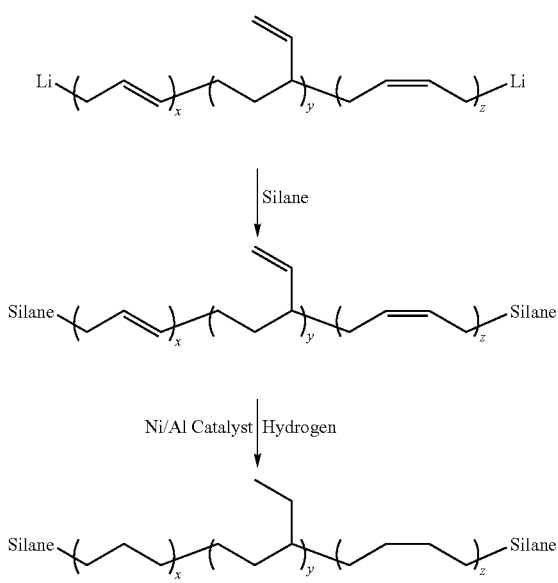

When a hydrogenated and functionalized polymer or copolymer of the present invention is used to prepare a composition, such as a curable sealant composition, it may be desirable to include additional additives known in the art to the product formulation. For example, hardeners (also known as curing catalysts), plasticizers, fillers, stabilizers, other miscellaneous ingredients known in the art, and mixtures thereof may preferably be added in an amount between about 60 and 80 wt % of the total composition.

Exemplary hardeners/curing catalysts include for instance, a titanate such as tetrabutyl titanate or tetrapropyl titanate; an organotin compound such as dibutyl tin dilaurate, dibutyl tin maleate, dibutyl tin diacetate, tin octylate or tin naphthenate; lead octylate; an amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methylmorpholine or 1,3-diazabicyclo-(5,4,6)undecene-7(DBU), and its salt with a carboxylic acid or the like; a polyamide having a low molecular weight obtained by the reaction of an excess polyamine with a polybasic acid; a reaction product of an excess polyamine with an epoxy compound; and a silane couping agent having an amino group, e.g. a silanol condensation catalyst such as γ-aminopropyltrimethoxysilane or N-(beta-aminoethyl)aminopropyl-methyl-dimethoxysilane; and the like. The curing catalysts may be employed alone or as a mixture thereof.

Exemplary plasticizers include, for instance, a hydrocarbon oil such as an alkyl diphenyl or a partially hydrogenated terphenyl; chlorinated paraffin or a phthalic acid ester such as dibutyl phthalate, diheptyl phthalate, di-(2-ethylhexyl)phthalate, butylbenzyl phthalate or butylphthalylbutyl glycolate; a non-aromatic dibasic acid ester such as dioctyl adipate or dioctyl sebacate; an ester of polyalkylene glycol such as diethylene glycol dibenzoate or triethylene glycol dibenzoate; a phosphoric acid ester such as tricresyl phosphate or tributyl phosphate; and the like, and mixtures thereof. The plasticizers are used alone or a mixture thereof. It is possible to mix the placticizers at the time when preparing the organic polymer. Plasticizers typically constitute between about 10% to 40% of the total composition. When a plasticizer is mixed with the hydrogenated and functionalized polymer or copolymer of the present invention, the mixture preferably has a room temperature viscosity of between about 10 and about 5000 poise, preferably between about 50 and about 2000 poise.

As the modifier, various silane coupling agents are used, as occasion demands. Examples of the silane coupling agents are, for instance, alkylalkoxysilanes such as methyltrimethoxysilane, dimethyldimethoxysilane such as dimethyldiisopropenoxysilane, methyltriisopropenoxysilane and γ-glycidoxypropylmethyldiisopropenoxysilane; alkoxysilanes having a functional group such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(beta-aminoethyl)aminopropylmethyldimethoxysilane, γ-mercapto-propyltrimethoxysilane and γ-mercaptopropylmethyldimethoxysilane; silicone varnish; polysiloxanes; and mixtures thereof. By employing the above-mentioned modifiers, it is possible to increase the hardness of the cured product or to decrease the hardness to give better elongation property. Modifiers typically constitute about 0.5% to 2% of the total composition.

Examples of fillers and reinforcing agents are, for instance, heavy or light calcium carbonate; calcium carbonate; the surface of which is treated with a fatty acid, a resin acid, a cationic surface active agent, or an anionic surface active agent; magnesium carbonate, talc, titanium oxide, barium sulfate, alumina, metal powder such as aluminum powder, zinc powder or iron powder, bentonite, kaoline clay, fumed silica, quartz powder, carbon black, and mixtures thereof. The fillers or reinforcing agents are employed alone or as an admixture thereof. When using the filler or the reinforcing agent capable of giving transparency to the composition such as fumed silica, sealing compositions having excellent transparency can be obtained. Fillers and/or reinforcing agents typically constitute between about 20% and 50% of the total composition.

Examples of typical stabilizers known in the art are antioxidants, radical chain terminators, ultraviolet absorbers, sequestrants, ozone degradation inhibitors, light stabilizers, and phosphorus type peroxide decomposers and mixtures thereof. Stabilizers typically constitute between about 0.1% and 5% of the total composition.

Examples of miscellaneous ingredients known in the art include, but are not limited to, lubricants, pigments, blowing agents, photocurable resins, thixotropic agents and mixtures thereof. Miscellaneous ingredients typically constitute about 0.5% to 2% of the total composition.

The curable composition of the present invention itself has good adhesion to glass, ceramics or metals. Additionally, the composition of the invention can be widely adhered to other various materials by employing primers. The adhesion property of the curable composition to various materials can be further improved by incorporation of adhesion accelerators such as epoxy resins, phenol resins, various silane coupling agents, alkyltitanates or aromatic polyisocyanates. The accelerators may be used alone or as an admixture thereof.

The curable polymer composition formed in accordance with the present invention is suitable for use as 2- and/or 1-part sealants. The resultant sealant may be applied at building sites to prevent moisture permeation. The alkoxysilane groups of the polymer composition form crosslinks upon exposure to moisture, resulting in cured building sealants. Cure times of between about a few hours and 7 days may be achieved by exposing the polymers to moisture in the air.

The present invention now will be described with reference to non-limiting examples. The following examples and tables are presented for purposes of illustration only and are not to be construed in a limiting sense.

EXAMPLES

An unsaturated polymer or copolymer such as polybutadiene, polystyrene-co-butadiene, or polyisoprene was synthesized anionically using an appropriate initiator. The polymerization was terminated using at least one equivalent terminal group/Li, most preferably 1.2-100, of an appropriate silane containing at least one reactive silicon-alkoxy bond, most preferably, three silicon-alkoxy bonds such as a trialkoxyalkylsilane or tetraalkoxysilane.

Hydrogenation was then performed on the functionalized polybutadiene. The active catalyst was prepared by addition of excess (typically 3.2-3.8 equivalents) alkyl aluminum reagent solution such as triethyl aluminum to an ice-chilled nickel carboxylate (typically nickel octoate) solution. The resulting solution was black with traces of precipitate. Medium-pressure $H_2$ (100-400 psi) is added, and the reaction mixture was stirred and heated, preferably between about 93° C. and 121° C., for 4-6 hours. Cooling to room temperature and releasing of $H_2$ terminates the reaction. The contents of the reactor appear black in color due to the presence of hydrogenation catalyst. Consequently, centrifuging the polymer solution over Norit A carbon pellets decolorized. Removal of the solvent was performed by distillation under reduced pressure or by use of a thin or wiped-film evaporator. The resulting hydrogenated polymer solution was transferred to a dry, moisture-free, sealed container. Analysis of the polymer by Nuclear Magnetic Resonance indicates 90-96% hydrogenation of the unsaturated olefin sites and 80-85% retention of the silane end groups. The polymer shows improved aging and physical properties compared to their non-hydrogenated analogs.

The functionalization and hydrogenation reactions are illustrated in the following scheme. The hydrogenation reaction data and physical property improvements of some representative hydrogenated polymers are tabulated in Table 1 and Table 2 respectively.

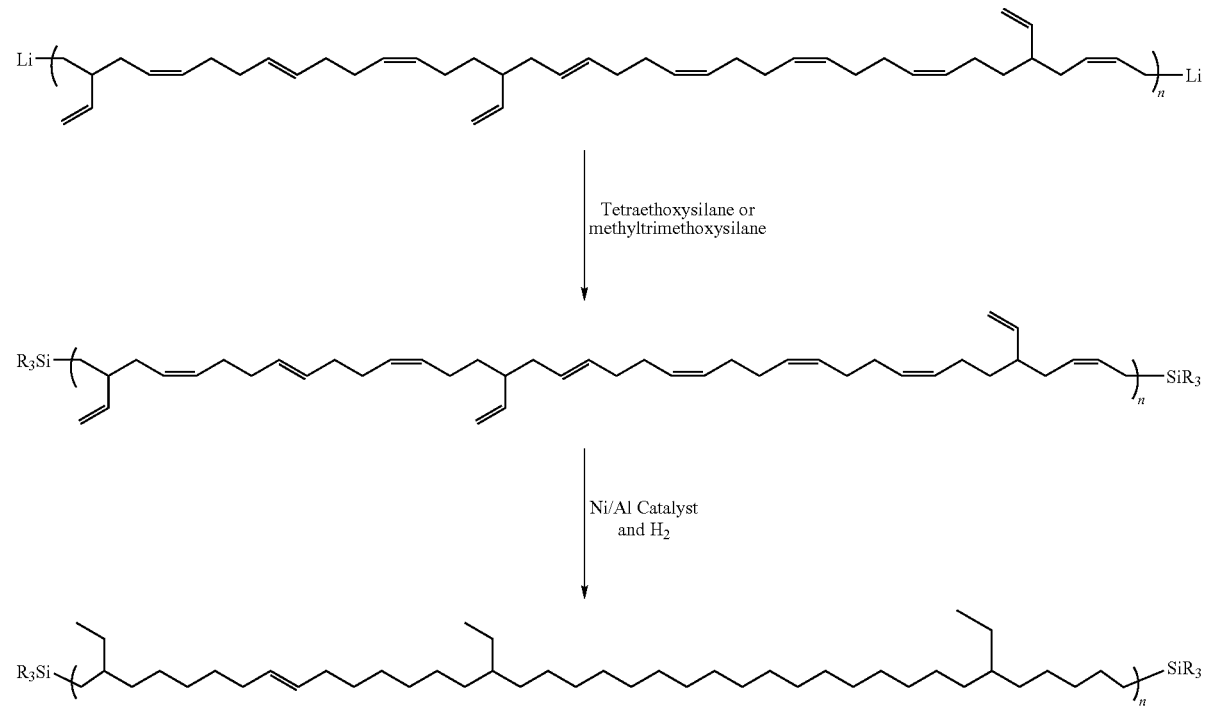

TABLE 1

Hydrogenated polymer data

| Example | Terminator/Initiator Ratio | Terminator | mmol Ni/ 100 g BR | Al/Ni Ratio | Reaction Time (hours) | Percent Hydrogenation | Percent End group retention |
|---|---|---|---|---|---|---|---|
| 1 | 1.2 | TEOS | 0 | 0 | 0 | 0 | 100 |
| 2 | 1.2 | TEOS | 1.43 | 10.0 | 4 | 73 | 30.8 |
| 3 | 1.2 | MTMS | 0 | 0 | 0 | 0 | 100 |
| 4 | 1.2 | MTMS | 1.98 | 3.2 | 6 | 92.3 | 80.5 |
| 5 | 1.2 | MTMS | 1.84 | 3.4 | 5 | 96 | 86.2 |

TABLE 1-continued

Hydrogenated polymer data

| Example | Terminator/Initiator Ratio | Terminator | mmol Ni/100 g BR | Al/Ni Ratio | Reaction Time (hours) | Percent Hydrogenation | Percent End group retention |
|---|---|---|---|---|---|---|---|
| 6 | 1.2 | MTMS | 2.04 | 6.6 | 6 | 40.7 | 71.6 |
| 7 | 1.2 | MTMS | 2.04 | 9.9 | 6 | Polymer Gelled | |
| 8 | 1.2 | MTMS | 1.98 | 10.4 | 6 | Polymer Gelled | |
| 9 | 2.0 | MTMS | 1.98 | 3.1 | 6 | 93 | 81.4 |
| 10 | 2.0 | MTMS | 1.98 | 3.7 | 6 | 91 | 74.8 |

TEOS: tetraethoxysilane.
MTMS: methyltrimethoxysilane.

TABLE 2

Physical property improvements of the hydrogenated polymer

| | | | | | | Sunshine weather meter | | |
|---|---|---|---|---|---|---|---|---|
| Example | Percent Hydrogenation | Percent End group retention | 50% modulus | $T_b$ [N/cm2] | $E_b$ [%] | 300 hours | 600 hours | 800 hours |
| 1 | 0 | 100 | 15.4 | 44 | 229 | Small cracks | Big cracks; color change | Big cracks; color change |
| 2 | 73 | 30.8 | 6.7 | 30.8 | 241 | No change | Cracks | Cracks |
| 3 | 0 | 100 | 10.2 | 30.5 | 365 | Small cracks | Big cracks; color change | Big cracks; color change |
| 5 | 96 | 86.2 | 3.4 | 57.7 | 1059 | No change | No change | Tacky; No cracks |

All of the subject testing was performed on an Instron machine 50% modulus was performed in accord with JIS A 1439; Tb was tested in accord with ISO 11600; $E_b$ was tested according to JIS A 5758; and Sunshine weather meter was performed at 63° using a carbon arc light source with water sprayed on the samples every 2 hours for 18 minutes.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A process for forming a polymer useful in a curable sealant composition comprising:
   a. initiating a living polymerization of conjugated diene monomers with a multi-functional initiator,
   b. terminating said polymerization with a tetra-substituted silicon compound of formula

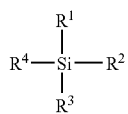

to produce a functionalized polymer, where $R^1$, $R^2$, $R^3$, and $R^4$ are independently selected from the group consisting of hydrocarbon groups, alkoxy groups and mixtures thereof, and no more than two of $R^1$, $R^2$, $R^3$, and $R^4$ may be hydrocarbon groups, and at least two of $R^1$, $R^2$, $R^3$, and $R^4$ are alkoxy groups, and
   c. hydrogenating the functionalized polymer in the presence of a catalyst system comprising a nickel carboxylate and alkylaluminum, wherein said catalyst system has a Al:Ni ratio between about 3.0 and about 4.0.

2. The process of claim 1, further comprising combining the polymer produced in step (c) with one or more sealant ingredients selected from the group consisting of plasticizers, fillers, reinforcing agents, modifiers, curing catalysts/hardeners, stabilizers, and mixtures thereof.

3. The process of claim 1, wherein said conjugated diene monomers are selected from the group consisting of 1,3-butadiene, isoprene, 1,3-pentadiene, 2,3-dimethyl-1,3-butadiene, 1,3-hexadiene, 2-methyl-1,3-pentadiene, 3,4-dimethyl-1,3-hexadiene, 4,5-diethyl-1,3-octadiene, 3-butyl-1,3-octadiene, phenyl-1,3-butadiene, and mixtures thereof.

4. The process of claim 1 wherein said living polymerization includes at least one additional monomer unit different from said conjugated diene monomer.

5. The process of claim 4 wherein said additional monomer unit is selected from the group consisting of vinyl aromatic hydrocarbon monomers, ethylene oxide, propylene oxide, styrene oxide, ethylene sulfide, propylene sulfide, styrene sulfide, acetaldehyde, propionaldehyde, isobutyraldehyde, n-caproaldehyde, ethanethial, propanethial, isobutylthioaldehyde, n-caprothioaldehyde, 3-dimethyl-oxycyclobutane, 3-diethyloxycyclobutane, 3-methylethyl-oxycyclobutane, 3-diemethylthiocycylobutane, 3-diethyl-thiocyclobutane, 3-methylethylthiocyclobutane, methylethyl thioketone, methyl isopropyl thioketone and diethyl thioketone, heterocyclic nitrogen containing monomers, and mixtures thereof.

6. The process of claim 1 wherein said polymer further includes at least one initiator residue.

7. The process of claim 1 wherein said alkoxy groups are selected from the group consisting of methoxy, ethoxy, propoxy, butoxy, pentoxy, and alkoxy groups with up to about 10 carbons, and mixtures thereof.

8. The process of claim 1 wherein said hydrocarbon groups are selected from the group consisting of methyl, ethyl, propyl, butyl, pentyl, hexyl, heptyl, octyl, nonyl, decyl, and mixtures thereof.

9. A curable sealant composition prepared according to claim 1.

* * * * *